(12) United States Patent
Kumar et al.

(10) Patent No.: US 11,582,317 B1
(45) Date of Patent: Feb. 14, 2023

(54) PAYLOAD RECORDING AND COMPARISON TECHNIQUES FOR DISCOVERY

(71) Applicant: ServiceNow, Inc., Santa Clara, CA (US)

(72) Inventors: Abhishek Kumar, Bangalore (IN); Tal Ben Ari, Petah Tikva (IL); Manish Satish Vimla Kumar, Bangalore (IN); Arik Sityon, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/665,928

(22) Filed: Feb. 7, 2022

(51) Int. Cl.
*G06F 13/00* (2006.01)
*H04L 67/00* (2022.01)
*H04L 69/24* (2022.01)
*H04L 69/18* (2022.01)
*G06F 3/048* (2013.01)

(52) U.S. Cl.
CPC .............. *H04L 67/34* (2013.01); *G06F 3/048* (2013.01); *H04L 69/18* (2013.01); *H04L 69/24* (2013.01)

(58) Field of Classification Search
CPC ......... H04L 67/34; H04L 69/18; H04L 69/24; G06F 3/048
USPC ......... 709/224, 223, 220–222, 203; 718/100, 718/105, 104
See application file for complete search history.

(56) References Cited

U.S. PATENT DOCUMENTS

| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |

(Continued)

FOREIGN PATENT DOCUMENTS

| EP | 0433979 | 6/1991 |
| EP | 1607824 | 12/2005 |

(Continued)

OTHER PUBLICATIONS

Rome IT Operations Management, ServiceNow, Jan. 20, 2022.

*Primary Examiner* — Kenneth R Coulter
(74) *Attorney, Agent, or Firm* — McDonnell Boehnen Hulbert & Berghoff LLP

(57) ABSTRACT

Persistent storage may contain an input discovery payload that contains entries representing configuration items and relationships therebetween, wherein the configuration items contain attributes defining devices, components, or applications on a network. One or more processors may be configured to: provide, for display, a graphical user interface containing a representation of the input discovery payload and a button; provide the input discovery payload to an identification and reconciliation engine (IRE) software application; receive, from the IRE software application, an output discovery payload that includes a log generated from execution of the IRE software application on the input discovery payload, wherein the log indicates, for the configuration items and the relationships in the input discovery payload, how a configuration management database (CMDB) would be updated by the IRE software application; and provide, for display, a further graphical user interface containing a further representation of the output discovery payload.

20 Claims, 15 Drawing Sheets

(56) References Cited

U.S. PATENT DOCUMENTS

| | | |
|---|---|---|
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,853,675 B2 * | 12/2010 | Cannon .................. H04L 41/00 455/457 |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,534,577 B2 * | 1/2020 | Kumar .................. G06F 7/14 |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 11,438,232 B2 * | 9/2022 | Gupta .................. H04L 41/0853 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0215713 A1 * | 9/2008 | Cannon .................. H04L 41/00 709/221 |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2015/0381419 A1 * | 12/2015 | Kumar .................. G06F 7/36 709/224 |
| 2018/0123940 A1 | 5/2018 | Rimar et al. |
| 2019/0104398 A1 | 4/2019 | Owen et al. |
| 2020/0050689 A1 | 2/2020 | Tai et al. |
| 2020/0204443 A1 | 6/2020 | Bar Oz et al. |
| 2021/0194764 A1 | 6/2021 | Badyan et al. |
| 2022/0029887 A1 * | 1/2022 | Gupta .................. H04L 41/0893 |
| 2022/0083883 A1 * | 3/2022 | Devanathan ........ G06F 16/9024 |
| 2022/0335141 A1 * | 10/2022 | Wolf .................. G06F 21/6218 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

* cited by examiner

```
{
  "items": [                                              ← 700
    {
      "className": "cmdb_ci_linux_server",
      "values": {
        "default_gateway": "10.196.102.1",
        "cpu_name": "Intel(R) Xeon(R) Gold 6240 CPU @ 2.60GHz",
        "short_description": "Linux c7inc0049582 3.10.0-957.el7.x86_64 #1 SMP Thu Nov 8 23:39:32 UTC 2018 x86_64 x86_64 x86_64 GNU/Linux",
        "os": "Linux CentOS",
        "fqdn": "https://www.service-now.com",
        "os_version": "7.6.1810",                         ← 702
        "cpu_manufacturer": "GenuineIntel",
        "cpu_speed": "2593",
        "cpu_core_thread": "1",                           ← 704
        "model_id": " VMware Virtual Platform",
        "ip_address": "10.196.102.207",
        "kernel_release": "3.10.0-957.el7.x86_64",
        "disk_space": "196.00",
        "sys_class_name": "cmdb_ci_linux_server",
        "manufacturer": "VMware, Inc.",
        "cpu_count": "2",                                 ← 706
        "cpu_type": "GenuineIntel",
        "name": "c7inc0049582",
        "classifier": "c27c1ccf0a0a0b1c006149d6a38f3958",
        "model_number": "None",
        "cpu_core_count": "1",
        "host_name": "c7inc0049582",
        "ram": "3951.0",
        "serial_number": "VMware-42 26 a1 fb a5 b0 eb 81-75 01 68 ad e8 ea 30 58",
        "serial_number_type": "system"
      },
      "internal_id": "bb357088-f996-4705-af96-d9d9155e4757"
    },{
      "className": "cmdb_ci_ip_address",
      "values": {
        "ip_version": "4",
        "install_status": "1",
        "netmask": "255.255.255.0",
        "name": "ens192",
        "ip_address": "10.196.102.207",
        "sys_class_name": "cmdb_ci_ip_address"
      },
      "internal_id": "b4afac0c-9beb-4a59-ada2-2015d413915b"
    }],
  "relations": {
    "type": "Owns::Owned by",
    "child": 1,                ← 708
    "parent": 0                ← 710
  }
}
```

FIG. 7A

```
{
  "items": [
    {
      "className": "cmdb_ci_linux_server",
      "values": {
        "default_gateway": "10.196.102.1",
        "cpu_name": "Intel(R) Xeon(R) Gold 6240 CPU @ 2.60GHz",
        "short_description": "Linux c7inc0049582 3.10.0-957.el7.x86_64 #1 SMP Thu Nov 8 23:39:32 UTC 2018 x86_64 x86_64 x86_64 GNU/Linux",
        "os": "Linux CentOS",
        "fqdn": "https://www.service-now.com",
        "os_version": "7.6.1810",
        "cpu_manufacturer": "0c43b088c6112275011a4bd46a4e6cc4",
        "cpu_speed": "2593",
        "cpu_core_thread": "1",
        "model_id": "a4427807773001104cb984e35b5a9910",
        "ip_address": "10.196.102.207",
        "kernel_release": "3.10.0-957.el7.x86_64",
        "disk_space": "196.00",
        "sys_class_name": "cmdb_ci_linux_server",
        "manufacturer": "ec427807773001104cb984e35b5a990d",
        "cpu_count": "2",
        "cpu_type": "GenuineIntel",
        "name": "c7inc0049582",
        "classifier": "c27c1ccf0a0a0b1c006149d6a38f3958",
        "model_number": "None",
        "cpu_core_count": "1",
        "host_name": "c7inc0049582",
        "ram": "3951.0",
        "serial_number": "VMware-42 26 a1 fb a5 b0 eb 81-75 01 68 ad e8 ea 30 58",
        "serial_number_type": "system"
      },
      "internal_id": "bb357088-f996-4705-af96-d9d9155e4757"
    },{
      "className": "cmdb_ci_ip_address",
      "values": {
        "ip_version": "4",
        "install_status": "1",
        "netmask": "255.255.255.0",
        "name": "ens192",
        "ip_address": "10.196.102.207",
        "sys_class_name": "cmdb_ci_ip_address"
      },
      "internal_id": "b4afac0c-9beb-4a59-ada2-2015d413915b"
    }],
  "relations": {
    "type": "Owns::Owned by",
    "child": "b4afac0c-9beb-4a59-ada2-2015d413915b",
    "parent": "bb357088-f996-4705-af96-d9d9155e4757"
  }
}
```

FIG. 7B

```
{
  "items": [
    {
      "className": "cmdb_ci_linux_server",
      "operation": "UPDATE",
      "sysId": "6d6840dc770101104cb984e35b5a99d8",
      "identifierEntrySysId": "c12f9be8c3400200d8d4bea192d3aea6",
      "identificationAttempts": [
        {
          "identifierName": "Hardware Rule",
          "attemptResult": "MATCHED",
          "attributes": [
            "serial_number",
            "serial_number_type"
          ],
          "searchOnTable": "cmdb_serial_number"
        }
      ]
    },
    {
      "className": "cmdb_ci_ip_address",
      "operation": "UPDATE",
      "sysId": "ad6840dc770101104cb984e35b5a99de",
      "identifierEntrySysId": "7641924db791201039251d4efe11a947",
      "identificationAttempts": [
        {
          "identifierName": "IP Address",
          "attemptResult": "MATCHED",
          "attributes": [
            "ip_address",
            "netmask",
          ],
          "searchOnTable": "cmdb_ci_ip_address"
        }]
    }],
  "relations": [
    {
      "className": "cmdb_rel_ci",
      "operation": "NO_CHANGE",
      "sysId": "a96840dc770101104cb984e35b5a99ed",
      "identifierEntrySysId": "Unknown",
      "inputIndices": [
        0
      ],
      "mergedPayloadIds": [],
      "markers": [],
      "warningCount": 0,
      "errorCount": 0
    }]
}
```

FIG. 7C

PAYLOAD RECORDING AND COMPARISON TECHNIQUES FOR DISCOVERY

BACKGROUND

In the context of computer networks, discovery refers to a set of procedures that can be used to find devices, components, applications, and services that exist on such networks as well as the relationships therebetween. Information about the hardware and software that is found may be stored in tables of a configuration management database (CMDB), which can later be searched and/or used by other applications to manage characteristics and performance of the devices, components, applications, and services.

When discovery fails in some fashion—in that the information stored in the CMDB is incomplete or otherwise not representative of the hardware and software as arranged on the network—determining root cause of the failure can be unduly burdensome if possible at all. Current tools and capabilities of discovery systems fail to provide a simple or unified way to examine discovery information received from the network and how it is modified prior to storage in the CMDB.

SUMMARY

The embodiments herein overcome these and potentially other drawbacks and limitations by providing ways to capture, review, and compare discovery information prior to or after it being is to a CMDB. In particular, this discovery information may be represented in several different payloads (e.g., files) while it is processed at different points in discovery.

An initial discovery payload, arranged in accordance with an initial format, may be received from a managed network by a computational instance of a remote network management platform. This initial discovery payload may contain a list of configuration items and their associated attributes, where each configuration item represents a discovered device, component, application, or service on the managed network. The initial discovery payload may also include a list of relationships between these configuration items.

The initial discovery payload may be stored in a task list or other type of queue and processed by one or more scripts. These scripts may transform the initial discovery payload into an input discovery payload by replacing certain attribute values with pre-determined unique identifiers, as well as optionally reformatting relationships for convenience.

The input discovery payload may be provided to an identification and reconciliation engine (IRE), which is a software application that determines how to use the input discovery payload to update the CMDB. Thus, for each discovered configuration item and relationship, the IRE may determine whether it is to be newly created in the CMDB, updated, or left as is. The IRE may create an output discovery payload, which is a log containing the results of executing the IRE on the input discovery payload. The output discovery payload may include entries indicating what actions were taken on the configuration items and relationships. If applicable, the output discovery payload may also indicate where they were written in the CMDB and any errors found by the IRE.

Each of these payloads may be in a structured text format, such as JavaScript Object Notation (JSON) or the eXtensible Markup Language (XML). But other textual or binary formats could be used.

The embodiments herein provide mechanisms to record these three payloads as discovery takes place. Later, they can be viewed and compared by way of a web-based interface. Alternatively or additionally, the web-based interface may execute or simulate execution of the scripts that transform the initial discovery payload into the input discovery payload, as well as the IRE procedures that produces the output discovery payload. This allows a user to rapidly determine the root cause of discovery failure without having to rerun discovery. Doing so facilitates debugging of discovery patterns, scripts, and IRE implementations, saving developers and end users a significant amount of time and effort.

Accordingly, a first example embodiment may involve persistent storage containing an input discovery payload that contains entries representing configuration items and relationships therebetween, wherein the configuration items contain attributes defining devices, components, or applications on a network. The first example embodiment may further involve one or more processors configured to: provide, for display on a client device, a graphical user interface containing a representation of the input discovery payload and a button; in response to receiving an indication that the button was actuated, provide the input discovery payload to an IRE software application; receive, from the IRE software application, an output discovery payload that includes a log generated from execution of the IRE software application on the input discovery payload, wherein the log indicates, for the configuration items and the relationships in the input discovery payload, how a CMDB would be updated by the IRE software application; and provide, for display on the client device, a further graphical user interface containing a further representation of the output discovery payload.

A second example embodiment may involve providing, for display on a client device, a graphical user interface containing a representation of an input discovery payload and a button, wherein the input discovery payload contains entries representing configuration items and relationships therebetween, and wherein the configuration items contain attributes defining devices, components, or applications on a network. The second example embodiment may also involve, in response to receiving an indication that the button was actuated, providing the input discovery payload to an IRE software application. The second example embodiment may also involve receiving, from the IRE software application, an output discovery payload that includes a log generated from execution of the IRE software application on the input discovery payload, wherein the log indicates, for the configuration items and the relationships in the input discovery payload, how a CMDB would be updated by the IRE software application. The second example embodiment may also involve providing, for display on the client device, a further graphical user interface containing a further representation of the output discovery payload.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A depicts an initial discovery payload, in accordance with example embodiments.

FIG. 7B depicts an input discovery payload, in accordance with example embodiments.

FIG. 7C depicts an output discovery payload, in accordance with example embodiments.

DETAILED DESCRIPTION

Figure 1:
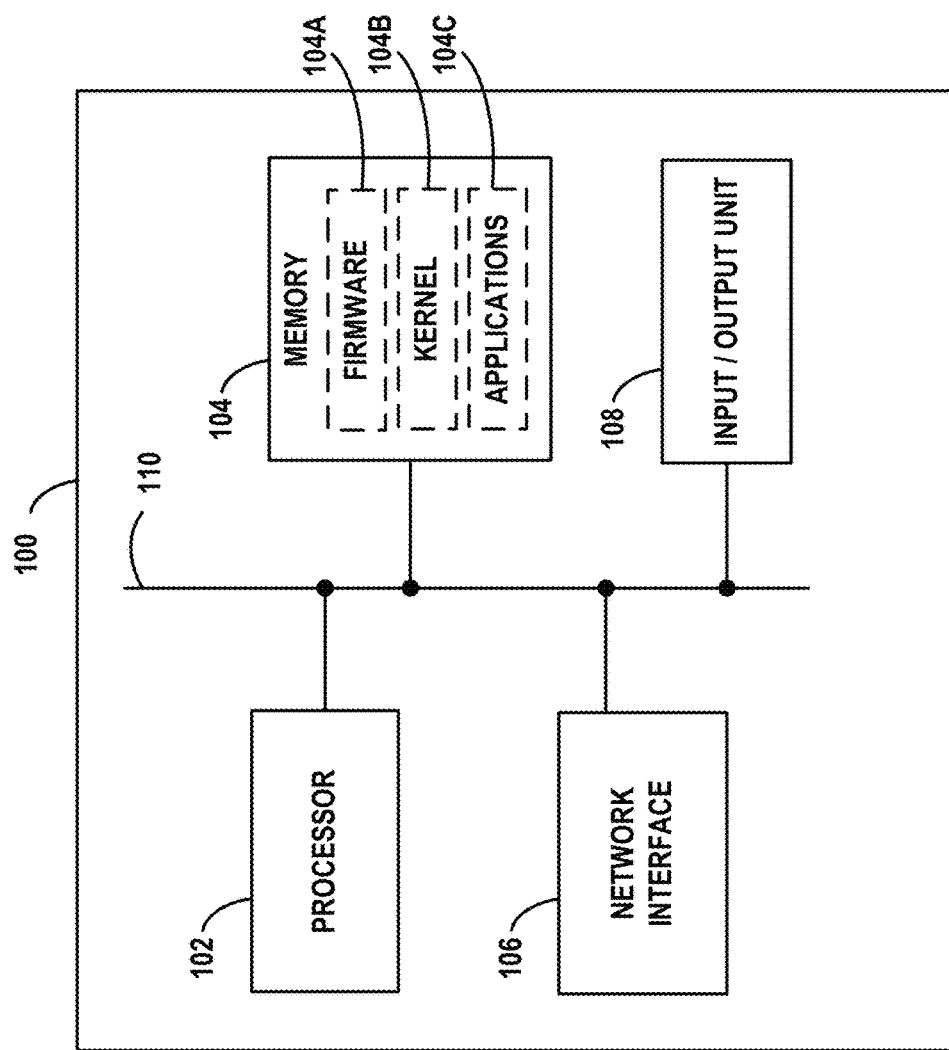
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
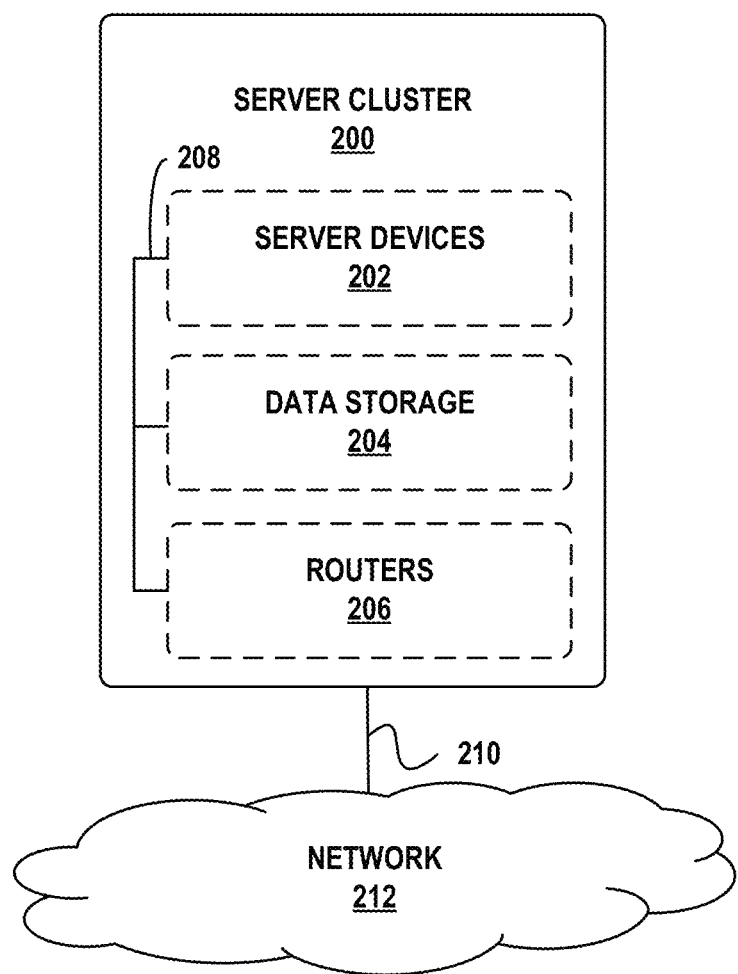
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the eXtensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
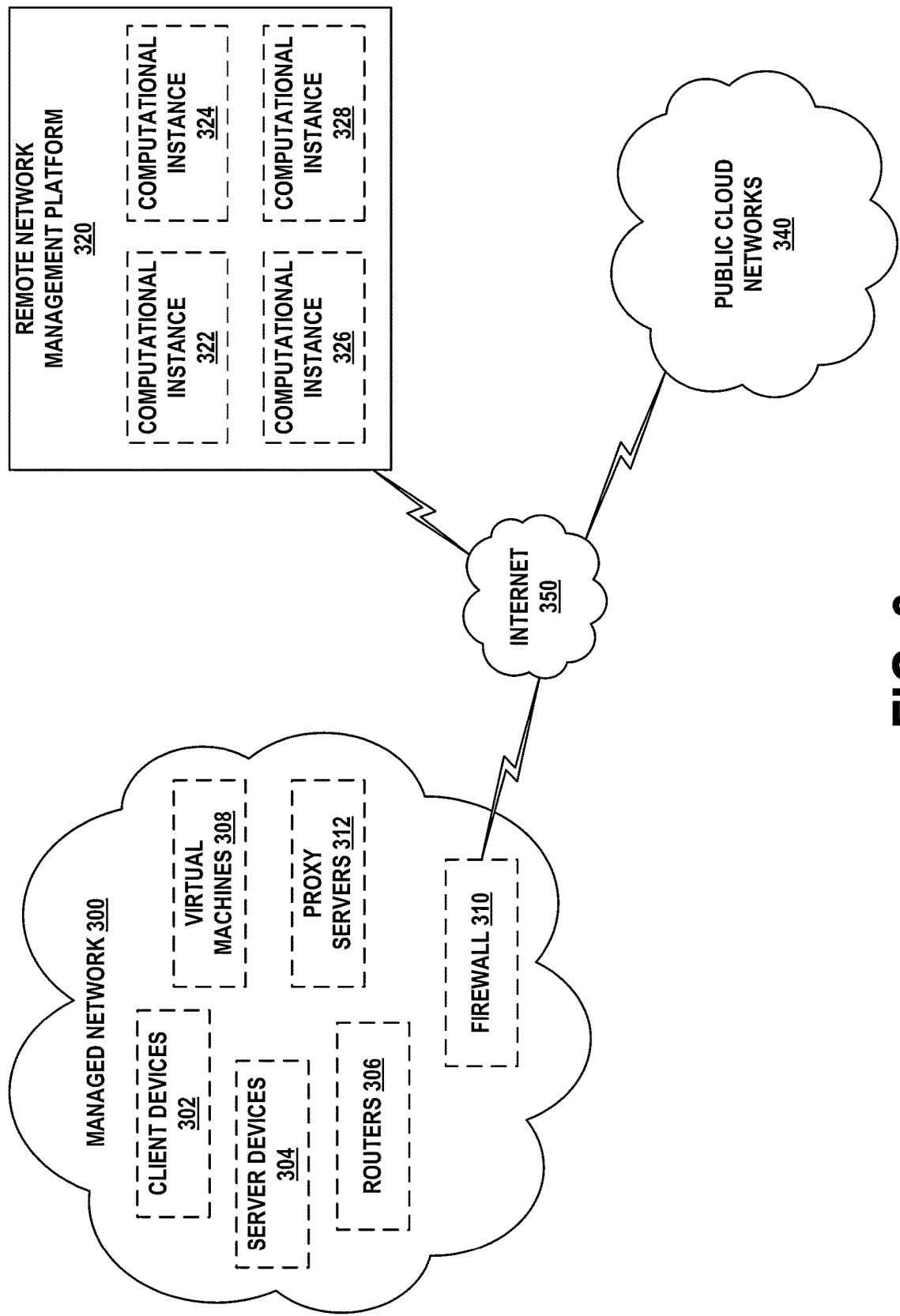
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
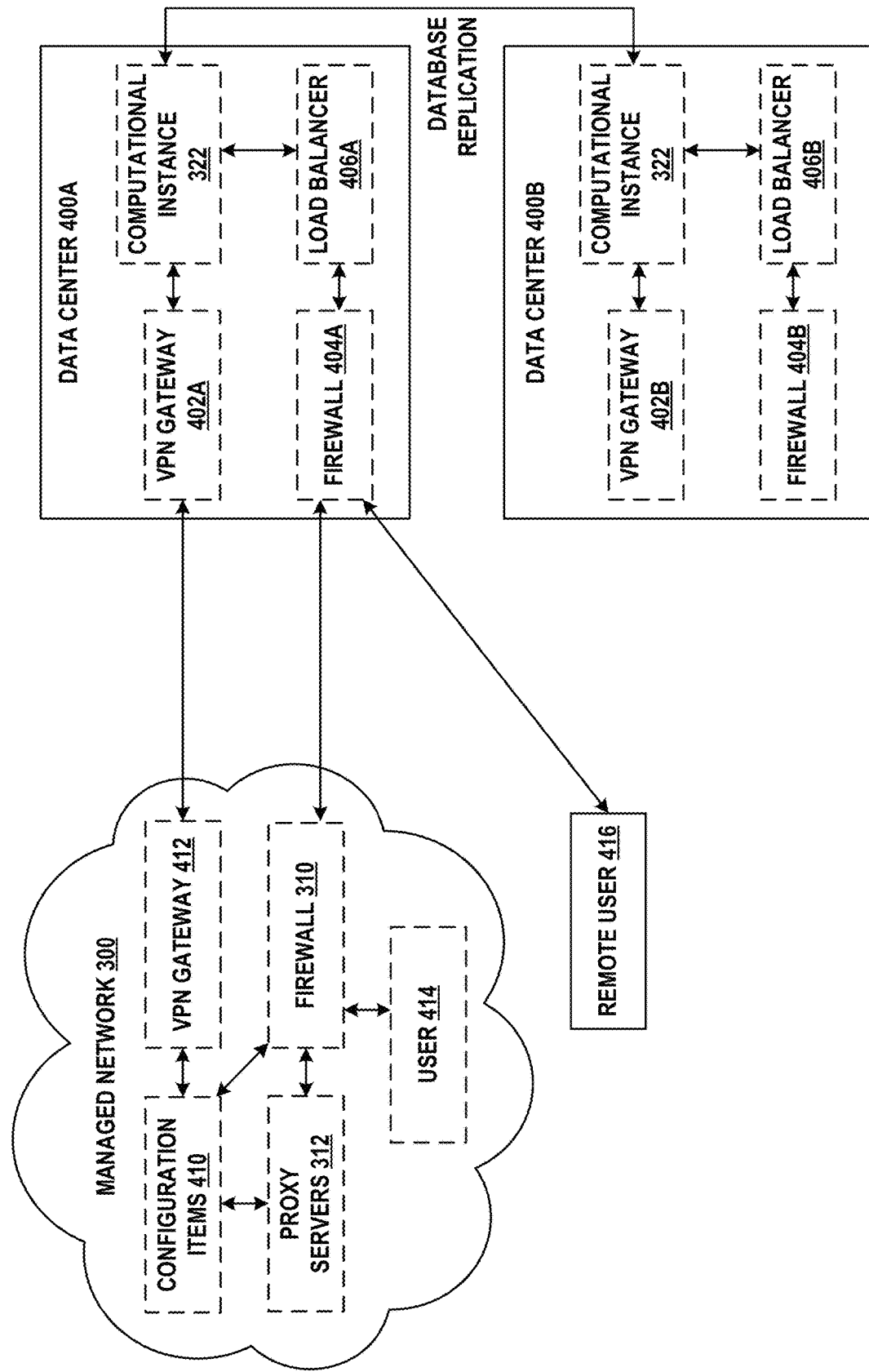
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
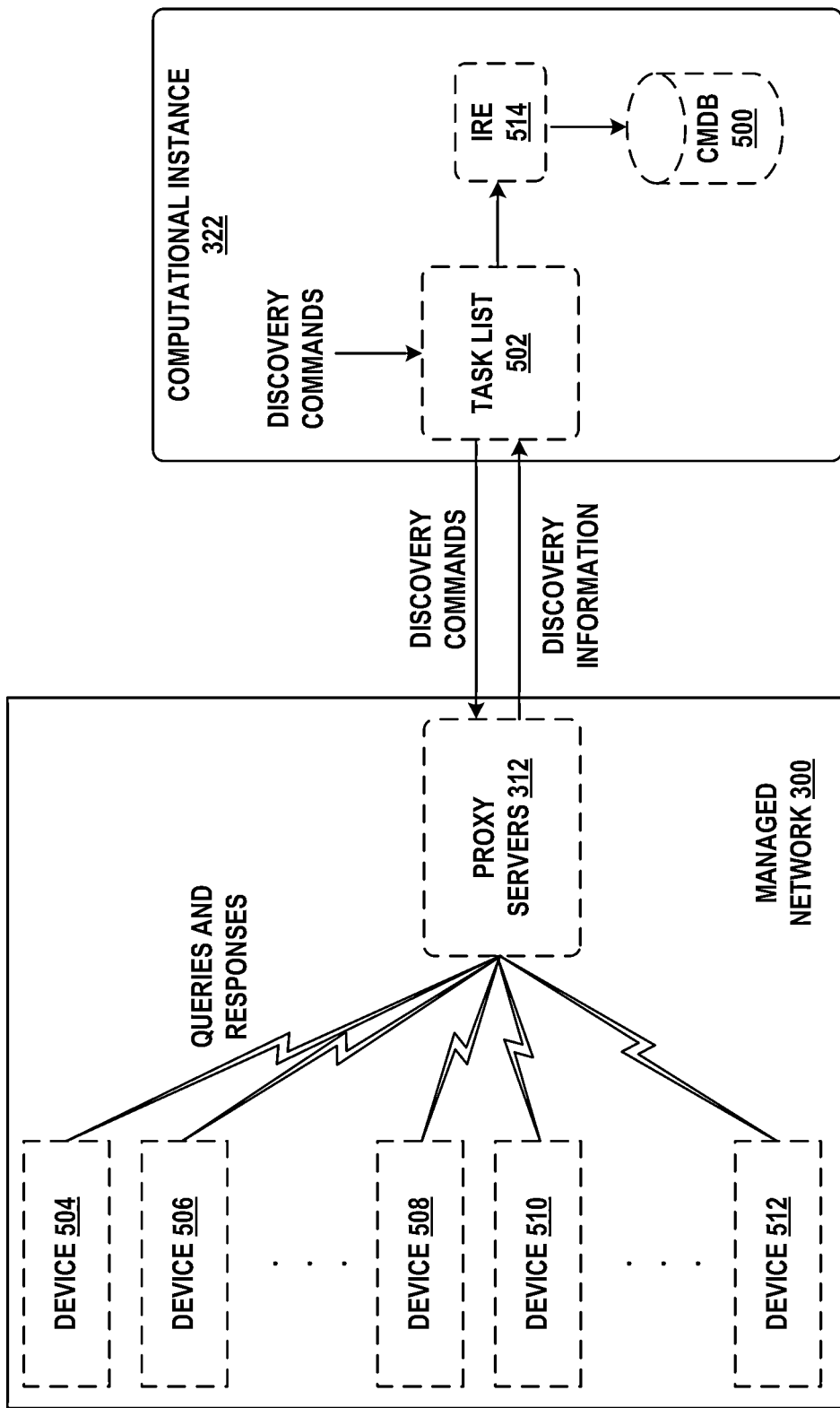
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Processing of Discovery Payloads

Despite best efforts, horizontal discovery (whether based on using probes and sensors or based on using patterns) and vertical discovery can fail from time to time. Such a failure may result in CMDB 500 not containing configuration items and/or relationships that accurately represent the devices, components, applications, and/or services deployed on managed network 300 that were expected to be discovered. The causes of discovery failures are potentially numerous—misconfigured hardware or software, network connectivity issues, attempts to use incorrect credentials, or errors in the software at proxy servers 312 or computational instance 322 that facilitate discovery procedures.

As an example of the latter, users of computational instance 322 may be able to edit and customize probes, sensors, and discovery patterns. But in doing so, the user might inadvertently introduce bugs or defects that result in discovery failures. Likewise, the software engineers that develop probes, sensors, and discovery patterns, as well as features of IRE 514, might also inadvertently introduce bugs or defects during this development.

Users and software engineers who become aware of discovery failures are often at a loss when trying to determine the root cause of these failures, as these causes might reside in managed network 300, computational instance 322, or anywhere in between. Further, some failures may be intermittent, and thus hard to reproduce.

Currently, debugging techniques rely on knowledge of obscure interfaces (e.g., being able to probe APIs of task list 502 and/or IRE 514, manual review of limited information in logs, and trial and error. All of these techniques are time consuming and unreliable whether used alone or in combination with each other. Further, in some cases discovery failures might only be found after the fact—perhaps hours or days after the failed discovery process was executed. In these cases, there may be no information remaining in computational instance 322 that can assist in the debugging procedure.

In order to appreciate how these problems can be addressed or at least mitigated, it is helpful to examine the processing of incoming discovery information in more depth. To that point, FIG. 6 provides a more detailed overview of the processing of incoming discovery information at task list 502 and IRE 514.

Arrangement 600 focuses on proxy servers 312, task list 502, IRE 514, and CMDB 500. These aspects are presented in isolation for sake of simplicity, and they may be placed with managed network 300 and computational instance 322 as shown in FIG. 5. But other architectures may be possible, such as proxy servers 312 being placed in one or more of public cloud networks 340.

Figure 6:
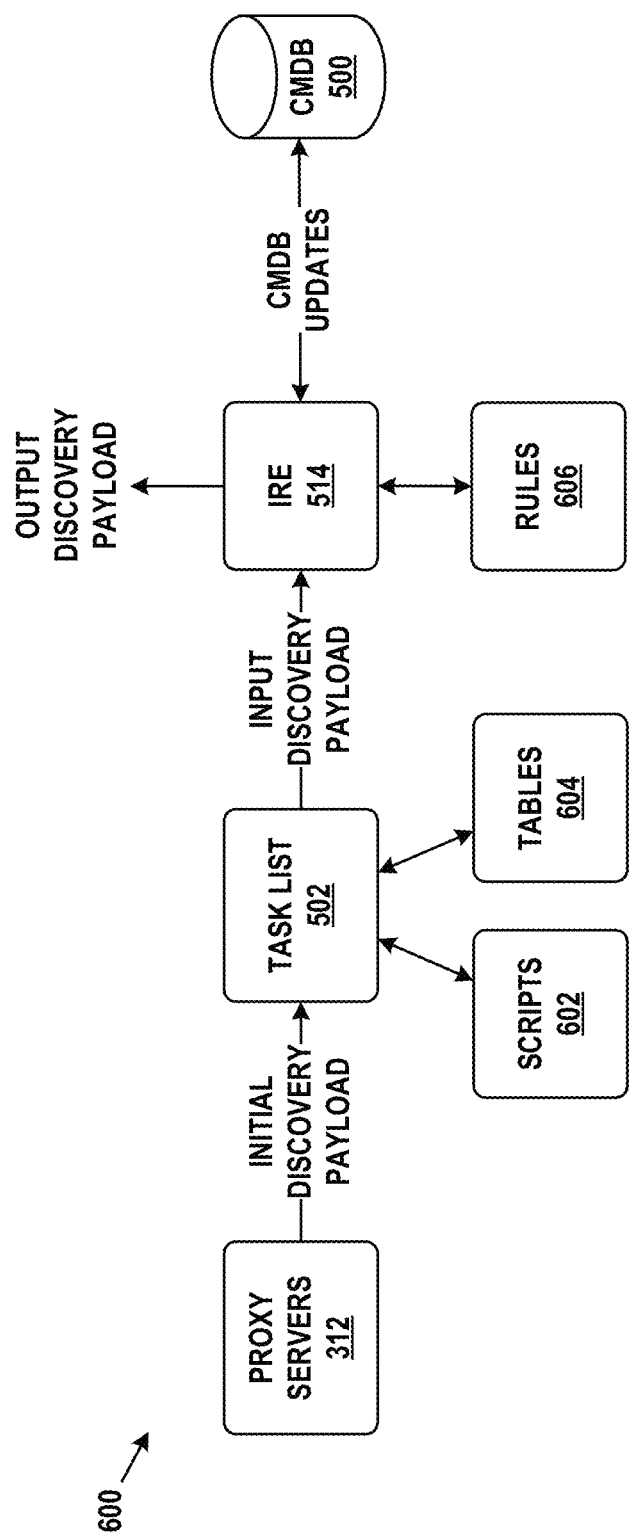
FIG. 6 depicts reception and transformation of discovery payloads, in accordance with example embodiments.

In FIG. 6, there are three distinct versions of incoming discovery information, each referred to as a "payload" or a "discovery payload". Each of these payloads may be in a structured text form, such as JSON or XML, but other textual or binary formats could be used.

Proxy servers 312 may transmit an initial discovery payload to task list 502. This initial discovery payload may contain a list of configuration items and their associated attributes, where each configuration item represents a discovered device, component, application, or service on managed network 300 (or on one of public cloud networks 340, if applicable). The initial discovery payload may also include a list of relationships between these configuration items.

Task list 502 may store the initial discovery payload in a queue for processing by one or more of scripts 602. As part of this processing, scripts 602 may replace certain text strings in the initial discovery payload with pre-determined unique identifiers. For example, discovery procedures carried out by way of proxy servers 312 may read attributes of devices on managed network 300, such as manufacturer names and model names. Task list 502 may replace these with unique identifiers representing the manufacturer names and model names, respectively.

Tables 604 may contain mappings of various manufacturer names and model names to corresponding unique identifiers. An example of the content of tables 604 is shown below. Notably, this example maps between: (i) and attribute, (ii) a string representing a value of this attribute, and (iii) a unique identifier of the attribute. The string is what could be read from a device during discovery operations carried out by proxy servers 312. Such a string may be read from a configuration file or by way of an API of a discovery device. The unique identifier specifies a bitstring representing a canonical value of the attribute.

| Attribute | String | Unique Identifier |
|---|---|---|
| cpu_manufacturer | GenuineIntel | 0c43b088c6112275011a4bd46a4e6cc4 |
| cpu_manufacturer | Intel | 0c43b088c6112275011a4bd46a4e6cc4 |
| manufacturer | VMware, Inc. | ec427807773001104cb984e35b5a990d |
| manufacturer | VMware, Inc | ec427807773001104cb984e35b5a990d |
| manufacturer | VMware | ec427807773001104cb984e35b5a990d |
| modelid | VMware Virtual Platform | a4427807773001104cb984e35b5a9910 |

In this example, both cpu_manufacturer entries representing Intel processor types are mapped to the same unique identifier. Likewise, three entries with different ways of specifying the VMware company in a manufacturer string are mapped to the same unique identifier (which is different from the previous unique identifier). The single model_id entry is mapped to yet another unique identifier.

An advantage of replacing strings read from devices, components, and/or applications with corresponding unique identifiers is that different devices, components, and applications may be arranged to use different strings to represent the same information. By performing the replacement, the unique identifiers can be used for the remaining steps of discovery payload processing as well as in configuration items stored in CMDB 500. This allows CMDB 500 to be more easily searched by any of these attributes.

In addition to replacing these and potentially other string values with unique identifiers, scripts 602 may reformat relationships for convenience. For instance, in the initial discovery payload, relationships may reference elements in JSON arrays implicitly by their numeric indices. Scripts 602 might include a unique identifier for each element, and the relationships may be reformatted to use these unique identifiers. Notably, the unique identifiers used for relationships may come from a different bitstring space than those used for attributes.

The result of applying scripts 602 to the initial discovery payload can be an input discovery payload that uses unique identifiers in place of strings that might otherwise be ambiguous and/or in place of implicit references to array elements. Other changes are possible as well.

The input discovery payload may be provided to IRE 514. As noted above, IRE 514 may be software that applies rules 606 to update CMDB 500 based on the discovery information within the input discovery payload. For example, rules 606 might determine, for each configuration item in the input discovery payload, whether the configuration item needs to be newly created in CMDB 500, the configuration item already exists in CMDB 500 and needs to be updated with new attribute values, or the configuration item already exists in CMDB 500 and does not need to be updated. Also, rules 606 may cause IRE 514 to create or update, in CMDB 500, relationships between configuration items.

As part of the process of interacting with and potentially modifying CMDB 500, IRE 514 may create the output discovery payload. This payload is a log generated from executing IRE 514 on the input discovery payload, and may contain information such as: a list of configuration items that were created or updated, the unique CMDB identifier (sys_id) of each of these configuration items, the database table to which each configuration item was written, and the rule used by the IRE to identify the configuration item. Further, if IRE 514 generates any errors when processing the input discovery payload, representations of these errors may also be logged to the output discovery payload. As noted above, IRE 514 may also create and/or update relationships between configuration items as well.

FIGS. 7A, 7B, and 7C provide examples of initial discovery payload 700, input discovery payload 720, and output discovery payload 740. Input discovery payload 720 is the result of executing the processing of task list 502 on initial discovery payload 700, and output discovery payload 740 is the result of executing the processing of IRE 514 on input discovery payload 720. All of these payloads are presented as JSON files, but other representations and formats may be possible.

For purposes of illustration and simplicity, initial discovery payload 700, input discovery payload 720, and output discovery payload 740 are abbreviated payloads representing just part of discovery run on a single device and one of its components. In general, discovery payloads can be much longer, containing information relating to more devices and components (as well as applications and services).

In FIG. 7A, initial discovery payload 700 consist mainly of two blocks—one for "items" (e.g., devices and components) and another for "relations" (e.g., relationships between pairs of the items). The "items" block includes a LINUX® server device with a className of "cmdb_ci_linux_server", and an IP address component with a className of "cmdb_ci_ip_address" (notably, components need not be physical and can instead represent aspects of a device's configuration). Each entry of the list of items in the "items" block includes a number of discovered attributes that relate to that item.

The "relations" block specifies an "Owns::owned by" relationship between LINUX® server device and the IP address (in other words, the LINUX® server device owns the IP address and the IP address is owned by the LINUX® server device). The "relations" block indicates that this is the case through references to each item's position in the "items" block and the designation of which is parent and which is child. Thus, the LINUX® server device, which appears at index 0, is the parent of the IP address, which appears at index 1.

As noted, the information in initial discovery payload 700 can be obtained by proxy servers 312 through use of probes and sensors and/or a discovery pattern. This information is generally read from the discovered devices and components (and applications and services when applicable). Thus, it is in a raw form and cannot be written directly to the CMDB without potentially causing duplicate entries or other ambiguities.

Proxy servers 312 provide initial discovery payload 700 to task list 502, which then applies scripts 602 to form input discovery payload 720. Scripts 602 may make use of tables 604 to modify the contents of initial discovery payload 700.

FIG. 7B depicts input discovery payload 720 as generated by the processing associated with task list 502. Input discovery payload 720 is identical to initial discovery payload 700 with a few exceptions.

Particularly, the processing associated with task list 502 replaced the "cpu_manufacturer", "model_id", and "manufacturer" attribute values with their unique identifiers from tables 604. As noted, this facilitates different spellings and arrangements of manufacturer names and models being treated consistently and uniformly in CMDB 500.

Further, the parent and child indices in the relation have been replaced with each item's "internal_id" field. This field stores a unique identifier assigned to each discovered item by proxy servers 312. Performing this replacement might not have a significant impact on IRE 514 and CMDB 500, but makes it much easier for a human user to debug discovery failures based on these payloads (e.g., the user does not have to count entries in the item list to associate relationships with items).

IRE 514 then updates CMDB 500 based on the content of input discovery payload 720. In particular, IRE 514 may examine the className and other attributes of an item in input discovery payload 720 to determine an identification rule to apply to the item. This combination of attributes is then used to determine whether there is a match for the item in CMDB 500.

For example, IRE 514 may use a rule that matches based on the value of the "ip_address" and "netmask" fields for the "cmdb_ci_ip_address" item in input discovery payload 720. If a configuration item of the class "cmdb_ci_ip_address" in CMDB 500 has the same "ip_address" and "netmask"

values (e.g., "10.196.102.207" and "255.255.255.0" in FIG. 7B), then this configuration item may be considered to be a match of the item in input discovery payload 720.

In the case of a match, IRE 514 may update the configuration item in CMDB 500 with attribute values from the item in input discovery payload 720 (to the extent that these attribute values differ from those already in the configuration item). If there is no match, IRE 514 may create a new configuration item in CMDB 500 with the attribute values.

IRE 514 can also update relationships in CMDB 500 in a similar fashion. In some cases, configuration items and/or relationships in CMDB 500 may be removed if they are not represented in input discovery payload 720.

As noted, IRE 514 may produce output discovery payload 740 as a log from its processing of input discovery payload 720. This log may contain, among other information, references to the configuration items that were created or updated, the rules used by the IRE to identify the respective configuration items, and any errors that IRE 514 found in input discovery payload 720.

FIG. 7C depicts output discovery payload 740 as the result of applying the processing of IRE 514 to input discovery payload 720. Accordingly, output discovery payload 740 contains a list of two configuration items (one for the LINUX® server device and the other for its IP address) and one relationship (between the LINUX® server device and its IP address). Output discovery payload 740 contains no errors, indicating that input discovery payload 720 was successfully processed in full.

Each item in output discovery payload 740 is specified with its className, the operation that IRE 514 applied to it (e.g., "CREATE", "UPDATE", or "NO_CHANGE"), its unique CMDB identifier (e.g., the value of the "sys_id" attribute), and a representation of the rule(s) used to identify the item. The latter is represented in a series of elements that specify the name of the rule, the table of CMDB 500 that was searched, the attributes used to match the item, and whether the match was successful.

For example, the LINUX® server device is identified by its sys_id, which is unique among configuration items in CMDB 500. It was matched to a configuration item in CMDB 500 by using the "Hardware Rule" rule, which involved searching the "cmdb_serial_number" table using the item's "serial_number" and "serial_number_type" attributes. Likewise, the IP address is identified by its sys_id. It was matched to a configuration item in CMDB 500 by using the "IP Address" rule, which involve searching the "cmdb_ci_ip_address" table using the item's "ip_address" and "netmask" attributes.

The relationship between these two configuration items is also identified by its sys_id. The identification of relationships is simpler than that of configuration items because relationships can be uniquely identified by the sys_ids of the two configuration items that have the relationship. Thus, output discovery payload 740 does not include information about identification or matching of the relationship, but does indicate that the relationship as represented in CMDB 500 was not changed.

As a point of clarification, there are three different types of unique identifiers discussed in the context of FIGS. 7A, 7B, and 7C. The "internal_id" attributes of FIGS. 7A and 7B are determined by proxy servers 312. The unique identifiers used to replace the text strings in initial discovery payload 700 with bitstrings in input discovery payload 720 are determined by the processing associated with task list 502. The sys_ids of configuration items are determined by processing associated with CMDB 500. Each of these types of unique identifiers may have different formats and spaces from which individual unique identifiers are drawn. These formats and spaces might or might not overlap.

Each of initial discovery payload 700, input discovery payload 720, and output discovery payload 740 may be written to output and/or log files and stored. For instance, proxy servers 312 may write initial discovery payload 700 before transmitting it, or task list 502 may write initial discovery payload 700 after receiving it. Likewise, task list 502 may write input discovery payload 720 before transmitting it, or IRE 514 may write input discovery payload 720 after receiving it. IRE 514 may write output discovery payload 740. Each of these payloads may be stored at one or more devices or databases within computational instance 322, for example.

Figure 8:
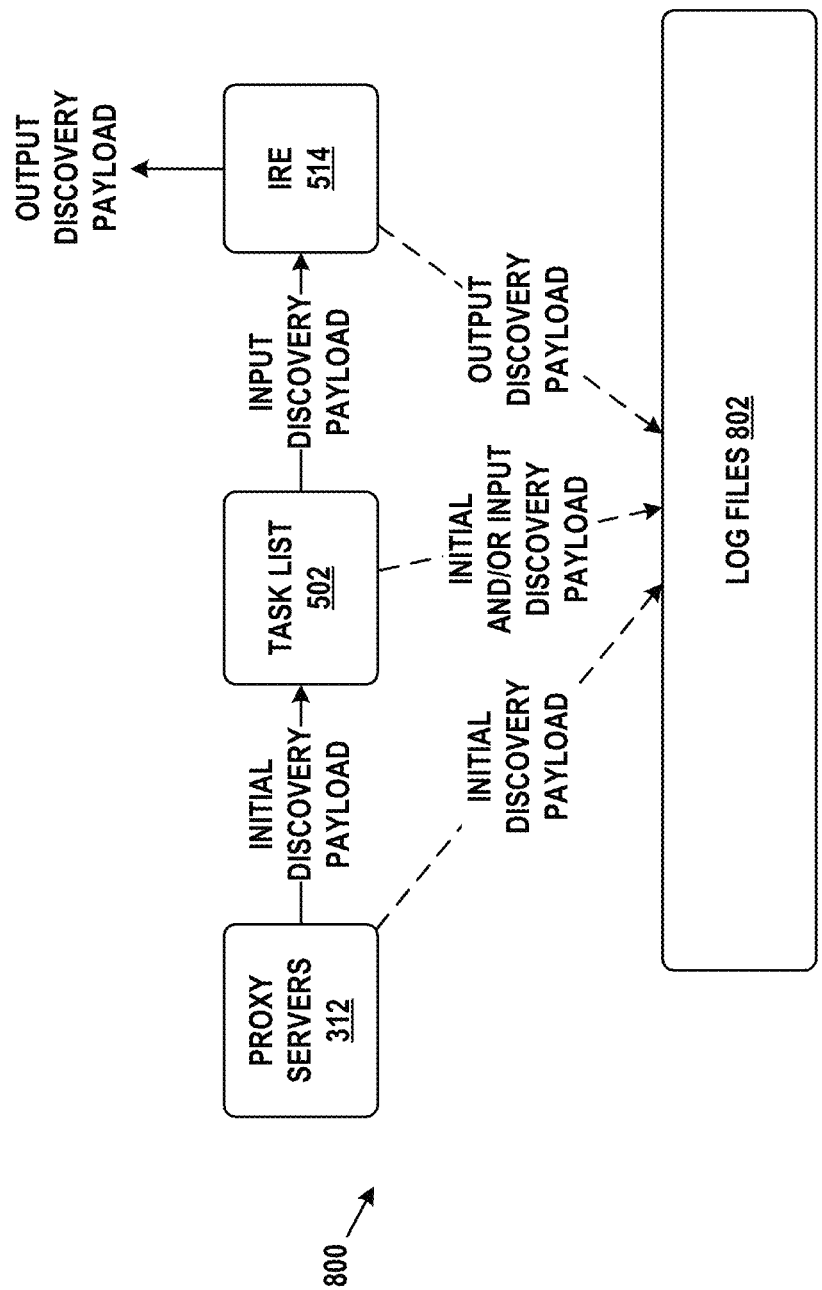
FIG. 8 depicts recording and storage of discovery payloads, in accordance with example embodiments.

FIG. 8 depicts arrangement 800, including log files 802 representing one or more log files that could be disposed in one or more locations internal or external to computational instance 322. Arrangement 800 is similar to that of arrangement 600, and illustrates how various software components that process incoming discovery information can write initial, input, and output discovery payloads to log files 802.

VII. Example Graphical User Interfaces

Computational instance 322 may also support one or more web-based graphical user interfaces that facilitate viewing of initial discovery payload 700, input discovery payload 720, and output discovery payload 740. These or other software tools may display, highlight differences between, and correlation information within, these payloads. With these interfaces, a user can step through a discovery process that occurred in the past. This enables the identification and determination of the root causes of errors in a rapid fashion. Further, until now, there was no other way to view an input discovery payload for a discovery process that occurred in the past.

In an alternative or additional embodiment, computational instance 322 can support a workflow that executes or simulates the processing of discovery information from beginning to end. This may involve obtaining the initial discovery payload and then simulating the processing associated with task list 502 and IRE 514. In this way the corresponding input discovery payload and output discovery payload can be determined and viewed, including an errors therein.

FIGS. 9A, 9B, 9C, and 9D depict a sequence of graphical user interface screens that can support such operations. Notably, these screens are just examples, and other screens with different content and/or layout may be possible. While these screens are focused on horizontal discovery, and pattern-based discovery in particular, they may be used for similar purposes with other types of discovery.

Figure 9A:
FIGS. 9A, 9B, 9C, and 9D depict graphical user interfaces, in accordance with example embodiments.

FIG. 9A depicts screen 900 displaying a menu for exploring a horizontal discovery log for a particular host (with the IP address 10.196.102.207, the same host that was subject of the discovery payloads shown in FIGS. 7A, 7B, and 7C). An option for displaying payload processing is shown as selected in the left side of the screen. Accordingly, the right side of the screen provides an overview of the processing of discovery payloads. Most relevantly, button 902 at the top right of screen 900 is actuatable to begin the display of discovery payloads.

Figure 9B:
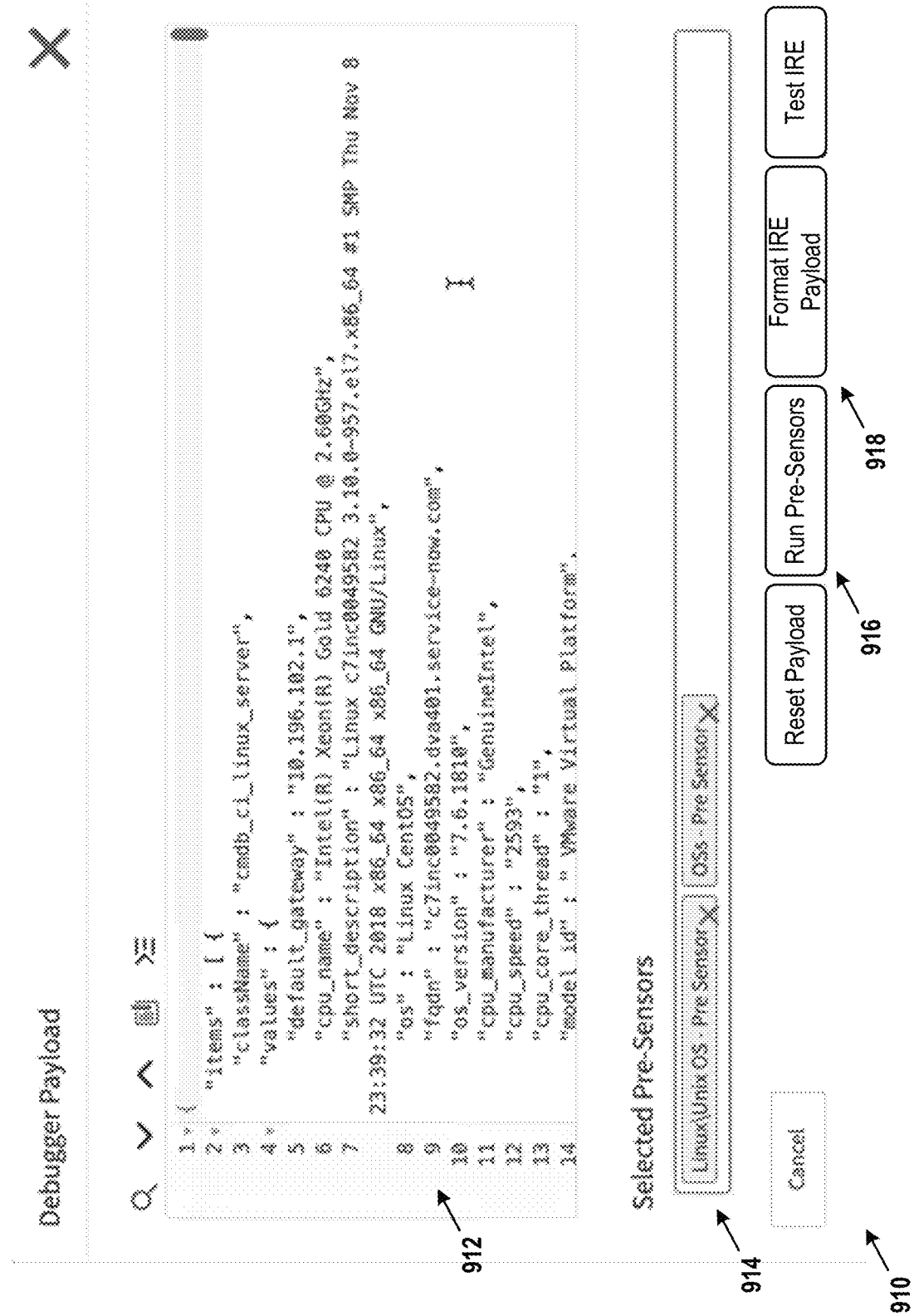

FIG. 9B depicts screen 910 displaying initial discovery payload 912 in a scrollable text box. As displayed, initial discovery payload 912 is related to the discovery log and represents part of a more complete version of initial discovery payload 700. Based on the content of initial discovery payload 912, two sensors (denoted as pre-sensors in FIGS.

9B, 9C, and 9D) have been determined to be relevant—an OS sensor for processing operating system discovery payloads and a LINUX® sensor for processing LINUX® operating system payloads.

Buttons 916 and 918 at the bottom middle of screen 910 are actuatable to run the sensors on and then format initial discovery payload 912. The sensors may replace values of certain attributes (e.g., "cpu_manufacturer", "manufacturer", and/or "model_id" attributes) with unique identifiers, and the formatting may replace implicit indexing into lists of items with explicit indexing using each item's "internal_id" attribute.

Figure 9C:
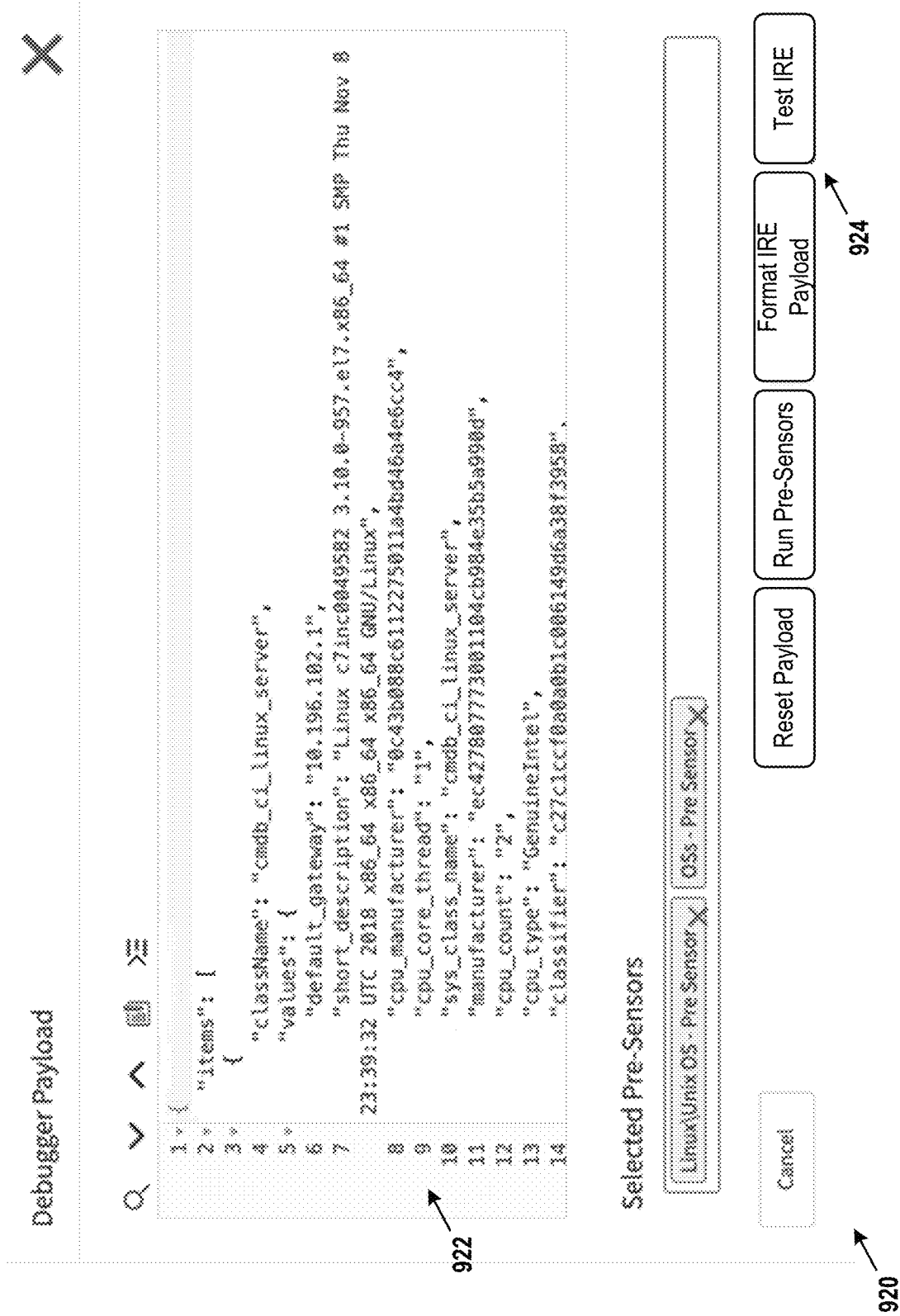

FIG. 9C depicts screen 920 displaying input discovery payload 922 in a scrollable text box, which represents the result of actuating buttons 916 and 918. As shown, the values of the "cpu_manufacturer" and "manufacturer" attributes have been replaced with unique identifiers. Although not shown in FIG. 9C for purposes of simplicity, the implicit indexing was replaced with explicit indexing as discussed above. Button 924 at the bottom right of screen 920 is actuatable perform IRE procedures on input discovery payload 922. This feature either provides input discovery payload 922 to IRE 514 and thus updates CMDB 500, or simulates doing so.

Figure 9D:
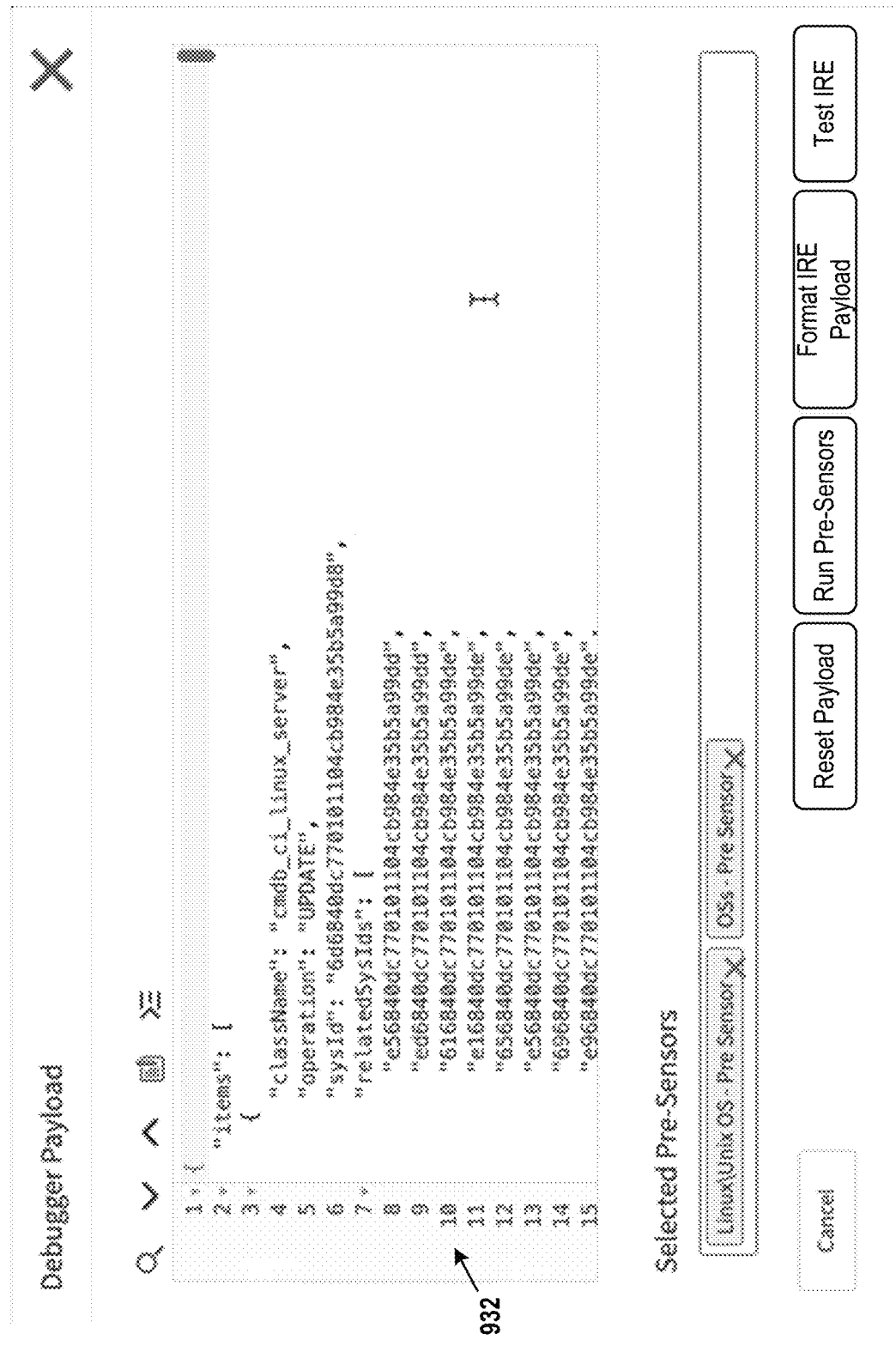

FIG. 9D depicts screen 930 displaying output discovery payload 932 in a scrollable text box, which represents the result of actuating button 924. As displayed, output discovery payload 932 represents part of a more complete version of output discovery payload 720.

With the workflow represented by FIGS. 9A, 9B, 9C, and 9D, a user or software developer can efficiently debug discovery failures, and identify whether the failure was caused by errors in a discovery pattern, proxy servers, sensors, probes, IRE, or some other factors. Further, this can be accomplished without rerunning discovery on an actual network or CMDB.

When errors occur in IRE processing, these errors may be identified in the output discovery payload. Further, screen 930 may include a link (not shown) to a knowledgebase article or other resource describing the types of errors present in the output discovery payload, and possibly suggestions on how those errors can be rectified.

VIII. Example Operations

Figure 10:
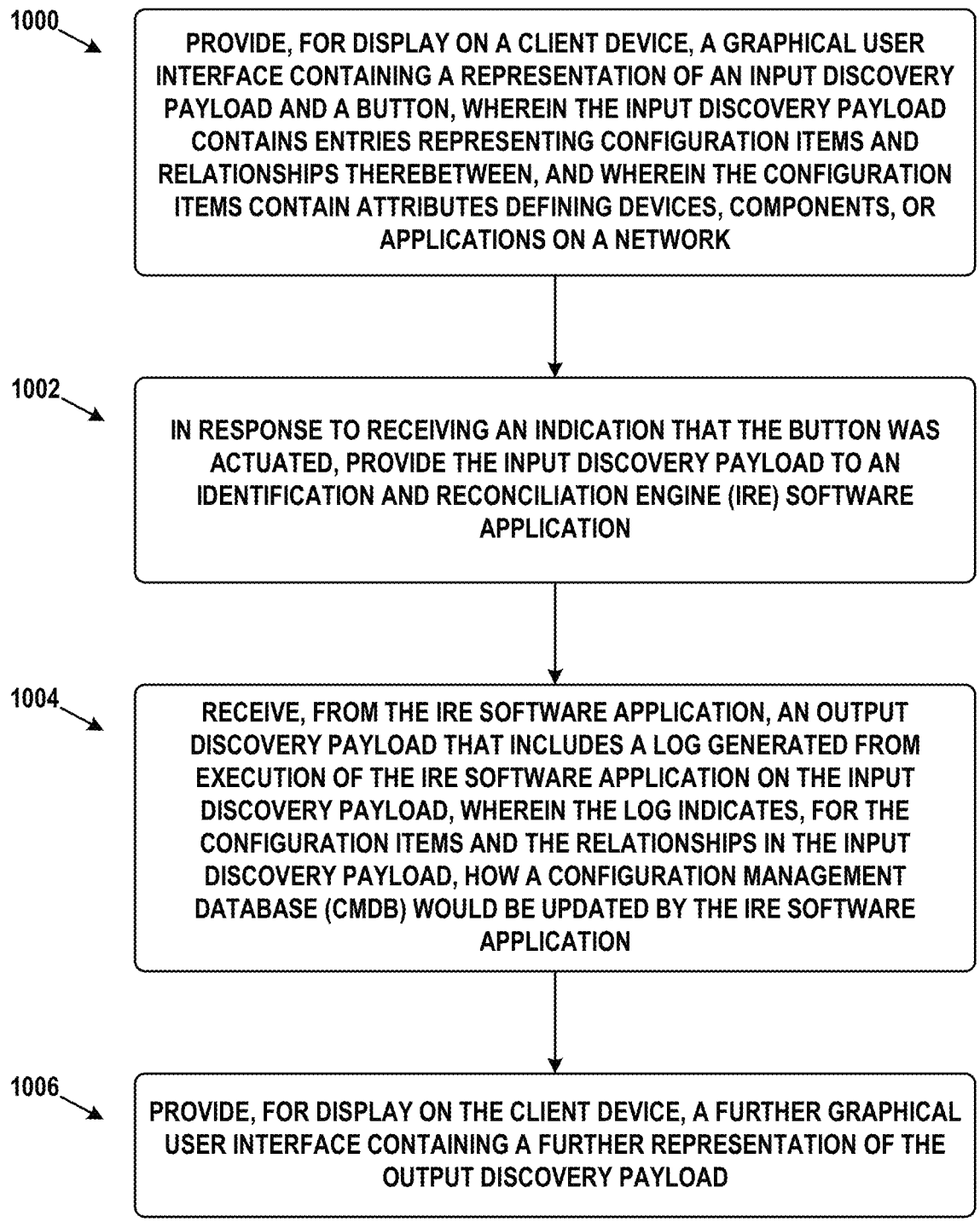
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve providing, for display on a client device, a graphical user interface containing a representation of an input discovery payload and a button, wherein the input discovery payload contains entries representing configuration items and relationships therebetween, and wherein the configuration items contain attributes defining devices, components, or applications on a network.

Block 1002 may involve, possibly in response to receiving an indication that the button was actuated, providing the input discovery payload to an IRE software application.

Block 1004 may involve receiving, from the IRE software application, an output discovery payload that includes a log generated from execution of the IRE software application on the input discovery payload, wherein the log indicates, for the configuration items and the relationships in the input discovery payload, how a CMDB would be updated by the IRE software application.

Block 1006 may involve providing, for display on the client device, a further graphical user interface containing a further representation of the output discovery payload.

In some embodiments, an initial discovery payload was received from a proxy server disposed within the network. These embodiments may further involve: prior to providing the graphical user interface, (i) providing an initial graphical user interface containing an initial representation of the initial discovery payload and one or more buttons, and (ii) in response to receiving one or more indications that the one or more buttons were actuated, transforming the initial discovery payload into the input discovery payload.

In some embodiments, transforming the initial discovery payload into the input discovery payload comprises replacing certain text strings in the attributes with pre-determined unique identifiers.

In some embodiments, the pre-determined unique identifiers were found by looking up the certain text strings in a table mapping text strings to unique identifiers.

In some embodiments, the log includes, for each of the configuration items, a matching rule used by the IRE software application, a subset of the attributes applied by the matching rule, and whether matching was successful.

In some embodiments, the log includes, for each of the configuration items and each of the relationships, whether it was created, updated, or not changed in the CMDB.

In some embodiments, the log specifies each of the configuration items and each of the relationships with a respective unique CMDB identifier.

In some embodiments, the graphical user interface containing the representation of the input discovery payload and the button, and the further graphical user interface containing the further representation of the output discovery payload, are both part of an ordered workflow of graphical user interfaces.

In some embodiments, the representation of the input discovery payload in the graphical user interface is provided in an editable form. In these embodiments, an edited version of the input discovery payload may be provided to the IRE software application.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing an input discovery payload that contains entries representing configuration items and relationships therebetween, wherein the configuration items contain attributes defining devices, components, or applications on a network; and
   one or more processors configured to:
      provide, for display on a client device, a graphical user interface containing a representation of the input discovery payload and a button;
      in response to receiving an indication that the button was actuated, provide the input discovery payload to an identification and reconciliation engine (IRE) software application;
      receive, from the IRE software application, an output discovery payload that includes a log generated from execution of the IRE software application on the input discovery payload, wherein the log indicates, for the configuration items and the relationships in the input discovery payload, how a configuration management database (CMDB) would be updated by the IRE software application; and
      provide, for display on the client device, a further graphical user interface containing a further representation of the output discovery payload.

2. The system of claim 1, wherein an initial discovery payload was received from a proxy server disposed within the network, and wherein the one or more processors are further configured to:
   prior to providing the graphical user interface, (i) provide an initial graphical user interface containing an initial representation of the initial discovery payload and one or more buttons, and (ii) in response to receiving one or more indications that the one or more buttons were actuated, transform the initial discovery payload into the input discovery payload.

3. The system of claim 2, wherein transforming the initial discovery payload into the input discovery payload comprises replacing certain text strings in the attributes with pre-determined unique identifiers.

4. The system of claim 3, wherein the pre-determined unique identifiers were found by looking up the certain text strings in a table mapping text strings to unique identifiers.

5. The system of claim 1, wherein the log includes, for each of the configuration items, a matching rule used by the IRE software application, a subset of the attributes applied by the matching rule, and whether matching using the matching rule was successful.

6. The system of claim 1, wherein the log includes, for each of the configuration items and each of the relationships, whether it was created, updated, or not changed in the CMDB.

7. The system of claim 1, wherein the log specifies each of the configuration items and each of the relationships with a respective unique CMDB identifier.

8. The system of claim 1, wherein the graphical user interface containing the representation of the input discovery payload and the button, and the further graphical user interface containing the further representation of the output discovery payload, are both part of an ordered workflow of graphical user interfaces.

9. The system of claim 1, wherein the representation of the input discovery payload in the graphical user interface is provided in an editable form.

10. The system of claim 9, wherein an edited version derived from the editable form of the input discovery payload is provided to the IRE software application.

11. A computer-implemented method comprising:
providing, for display on a client device, a graphical user interface containing a representation of an input discovery payload and a button, wherein the input discovery payload contains entries representing configuration items and relationships therebetween, and wherein the configuration items contain attributes defining devices, components, or applications on a network;
in response to receiving an indication that the button was actuated, providing the input discovery payload to an identification and reconciliation engine (IRE) software application;
receiving, from the IRE software application, an output discovery payload that includes a log generated from execution of the IRE software application on the input discovery payload, wherein the log indicates, for the configuration items and the relationships in the input discovery payload, how a configuration management database (CMDB) would be updated by the IRE software application; and
providing, for display on the client device, a further graphical user interface containing a further representation of the output discovery payload.

12. The computer-implemented method of claim 11, wherein an initial discovery payload was received from a proxy server disposed within the network, and wherein the computer-implemented method further comprises:
prior to providing the graphical user interface, (i) providing an initial graphical user interface containing an initial representation of the initial discovery payload and one or more buttons, and (ii) in response to receiving one or more indications that the one or more buttons were actuated, transforming the initial discovery payload into the input discovery payload.

13. The computer-implemented method of claim 12, wherein transforming the initial discovery payload into the input discovery payload comprises replacing certain text strings in the attributes with pre-determined unique identifiers.

14. The computer-implemented method of claim 13, wherein the pre-determined unique identifiers were found by looking up the certain text strings in a table mapping text strings to unique identifiers.

15. The computer-implemented method of claim 11, wherein the log includes, for each of the configuration items, a matching rule used by the IRE software application, a subset of the attributes applied by the matching rule, and whether matching using the matching rule was successful.

16. The computer-implemented method of claim 11, wherein the log includes, for each of the configuration items and each of the relationships, whether it was created, updated, or not changed in the CMDB.

17. The computer-implemented method of claim 11, wherein the log specifies each of the configuration items and each of the relationships with a respective unique CMDB identifier.

18. The computer-implemented method of claim 11, wherein the graphical user interface containing the representation of the input discovery payload and the button, and the further graphical user interface containing the further representation of the output discovery payload, are both part of an ordered workflow of graphical user interfaces.

19. The computer-implemented method of claim 11, wherein the representation of the input discovery payload in the graphical user interface is provided in an editable form.

20. A system comprising:
a task list software application configured to receive an initial discovery payload from a proxy server disposed within a network and transform the initial discovery payload into an input discovery payload, wherein the initial discovery payload contains entries representing configuration items, wherein the configuration items contain attributes defining devices, components, or applications on the network;
an identification and reconciliation engine (IRE) software application configured to receive the input discovery payload, and generate an output discovery payload, wherein the output discovery payload indicates, for each of the configuration items, a matching rule used by the IRE software application, a subset of the attributes applied by the matching rule, and whether matching was successful;
a configuration management database (CMDB) configured to receive updates to stored configuration items based on matches made by the IRE software application; and
persistent storage configured to receive corresponding copies of one or more of the initial discovery payload, the input discovery payload, and the output discovery payload, and to provide the corresponding copies on demand for display.

* * * * *